United States Patent [19]

Gotoh

[11] Patent Number: 4,784,312
[45] Date of Patent: * Nov. 15, 1988

[54] METHOD OF PRODUCING A FRAME BODY FOR AN ELECTRIC MOTOR

[75] Inventor: Tohru Gotoh, Nagoya, Japan

[73] Assignee: Mitsubishi Denki Kabushiki Kaisha, Tokyo, Japan

[*] Notice: The portion of the term of this patent subsequent to Feb. 17, 2004 has been disclaimed.

[21] Appl. No.: 923,212

[22] Filed: Oct. 27, 1986

[30] Foreign Application Priority Data

Oct. 25, 1985 [JP] Japan .................................. 60-239106

[51] Int. Cl.[4] ........................ B21D 39/00; B23K 31/06
[52] U.S. Cl. ...................................... 228/157; 228/179
[58] Field of Search ............... 228/147, 151, 179, 155, 228/157

[56] References Cited

U.S. PATENT DOCUMENTS

| | | | |
|---|---|---|---|
| 330,338 | 11/1885 | Lippincott | 228/151 |
| 1,120,209 | 12/1914 | Lloyd | 228/151 |
| 4,148,426 | 4/1979 | Midzutani et al. | 228/151 X |
| 4,643,346 | 2/1987 | Gotoh | 228/155 |

*Primary Examiner*—Kenneth J. Ramsey
*Attorney, Agent, or Firm*—Oblon, Fisher, Spivak, McClelland & Maier

[57] ABSTRACT

A method of producing a frame body for an electric motor comprises a step of bending a flat plate having a given size into a generally round body, a step of pressing the generally round body in the radial direction by a metal mold having a given inner diameter, a step of welding edge surface portions opposing each other of the generally round body to form a cylindrical frame body, a step of attaching heat radiation fins on the outer circumferential surface of the frame body by welding, and a step of pressing the inner circumferential surface of the frame body in the radial direction so that the frame body has a predetermined inner diameter.

5 Claims, 4 Drawing Sheets

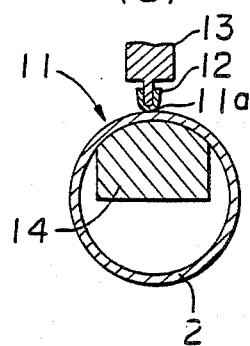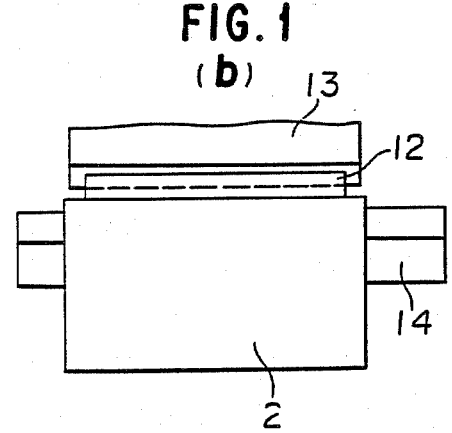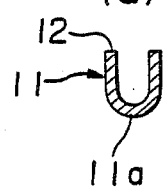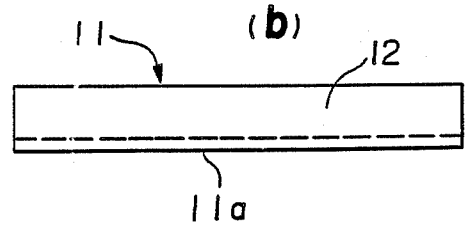

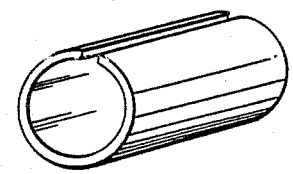
FIG. 3 (a)    FIG. 3 (b)
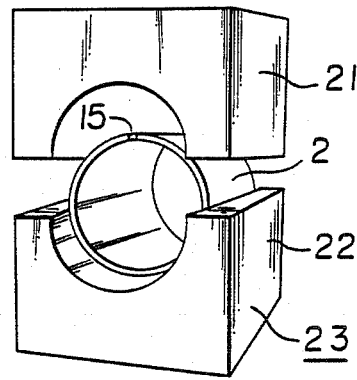
FIG. 3 (c)
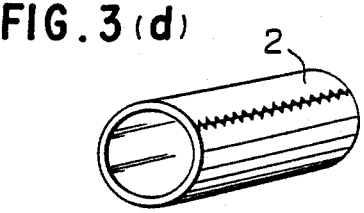
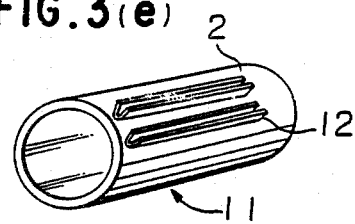
FIG. 3 (d)    FIG. 3 (e)
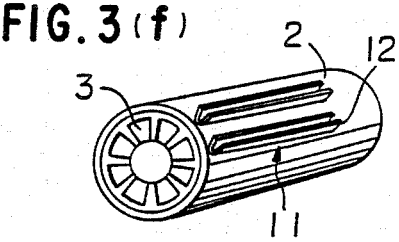
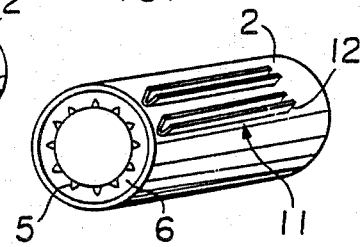
FIG. 3 (f)    FIG. 3 (g)

FIG. 5 (a) Prior Art
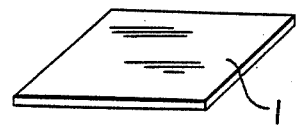
FIG. 5 (b)
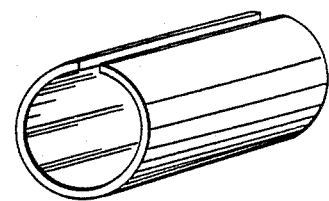
FIG. 5 (c)
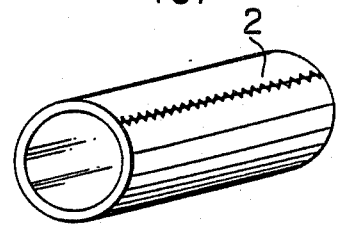
FIG. 5 (d)
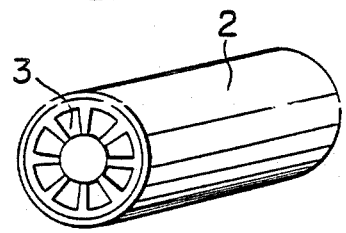
FIG. 5 (e)
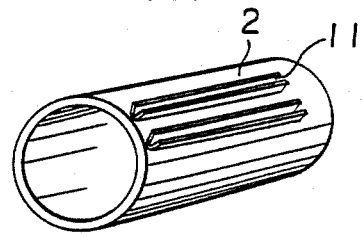
FIG. 5 (f)
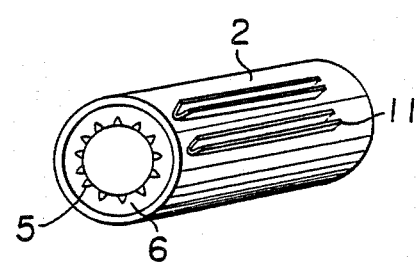

METHOD OF PRODUCING A FRAME BODY FOR AN ELECTRIC MOTOR

BACKGROUND OF THE INVENTION

1. Field of the Invention

The present invention relates to a method of producing a frame body for an electric motor provided with heat radiation fins.

2. Background Art

The operation of electromagnetic apparatuses causes a temperature rise due to internal power loss. In an electric motor, a plurality of radiation fins are attached onto the outer circumferential surface of the frame body to increase the surface area of the frame body in contact with air. The heat radiation fins function to release heat produced in the motor to the outside to thereby prevent the temperature rise.

The motor frame with the heat radiation fins has been prepared in accordance with manufacturing steps as shown in FIG. 5. Namely, a rectangular or square flat plate 1 having a predetermined size (shown in FIG. 3a) is bent into a generally round shape by subjecting it in a rolling machine having two or three rolls (not shown), as shown in FIG. 3b. The generally round-shaped body is forwarded to a welding section where the opposing edge surface portions of the round-shaped body are brought to contact with each other and they are bonded by welding in the longitudinal direction to thereby form a cylindrical frame body 2 (FIG. 5c). The cylindrical frame body 2 is then subjected to a plastic process for regulating the shape. Namely, a plurality of expansion pawl members 3 is inserted in the frame body 2 and are extended in the radial direction, whereby the inner circumferential surface of the frame body 2 is expanded in the radial direction so as to render the inner diameter of the frame body to be a nearly true circle and to make an inner diameter suitable for forcibly inserting a stator core which is described below (FIG. 5d). Then, as shown in FIG. 5e, heat radiation fins 11 formed in a U-shaped in cross section are attached onto the outer circumferential surface of the frame body 2 by projection welding. Thus, the frame body 2 with a plurality of heat radiation fins 11 is prepared.

A stator core 6 with a number of slots 5 in which coils (not shown) are inserted is forcibly fitted into the frame body 2 (FIG. 5f) to thereby fabricate a stator as shown in FIG. 6.

During the operation of the motor having the stator 6, heat produced from the stator core 6 is transmitted from the contacting area 7 between the stator core 6 and the frame body 2 through the frame body 2 and the welded portions 8 of the heat radiation fins 11 to the heat radiation fins 11; thus the heat is released outside.

In the electric motor of this type, it is necessary to increase the surface area of the contacting part 7 and the surface area of the welded portions 8 in order to increase an amount of heat radiation produced in the stator core 6.

However, when the surface area of the welded portions 8 is increased, much heat resulting from the welding is absorbed in the frame body 2. Accordingly, the shape of the inner diameter portion of the frame body 2 is deformed into a substantially oval shape due to thermal stress caused by the welding. In addition, the frame body 2 itself expands in the circumferential direction at positions near the welded portions 8.

Accordingly, in the motor frame prepared by the conventional method, the surface area between the frame body 2 and the stator core 6 is small with the consequence that thermal resistance of contact increases depending on the small surface area of contact, whereby thermal transmission properties from the stator core 6 to the heat radiation fins 11 is reduced. As a result, the function of the heat radiation fins 11 to prevent temperature rise of the coils of the electric motor is reduced.

SUMMARY OF THE INVENTION

It is an object of the present invention to provide a method of producing a frame body for an electric motor having excellent heat radiation characteristics by providing a sufficient surface area of contact between the frame body and the stator core and allowing the inner circle of the cylindrical frame body to be a substantially true circle.

The foregoing and the other objects of the present invention have been attained by providing a method of producing a frame body for an electric motor which comprises a step of bending a flat plate having a given size into a generally round body, a step of pressing the generally round body in the radial direction by a metal mold having a given inner diameter, a step of welding opposite edge surface portions of the generally round body to form a cylindrical frame body, a step of attaching heat radiation fins on the outer circumferential surface of the frame body by welding, and a step of pressing the inner circumferential surface of the frame body in the radial direction so that the frame body has a predetermined inner diameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a and 1b are respectively a cross-sectional view and a side view showing an apparatus used for an embodiment of the method of the present invention;

FIGS. 2a and 2b are respectively a cross-sectional view and a side view showing a heat radiation fin attached to a frame body by welding according to the method of the present invention;

FIGS. 3a through 3g are perspective views showing steps in an embodiment of the method of the present invention;

FIGS. 5a through 5f are respectively schematic views showing steps of a conventional method of producing a motor frame.

DETAILED DESCRIPTION OF THE PREFERRED EMBODIMENT

Figure 4:
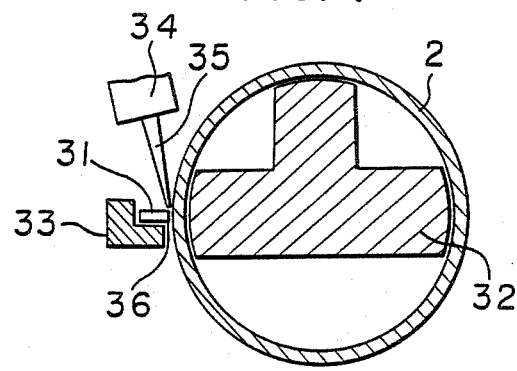
FIG. 4 is a cross-sectional view showing an apparatus used for another embodiment of the method of the present invention.
Figure 6:
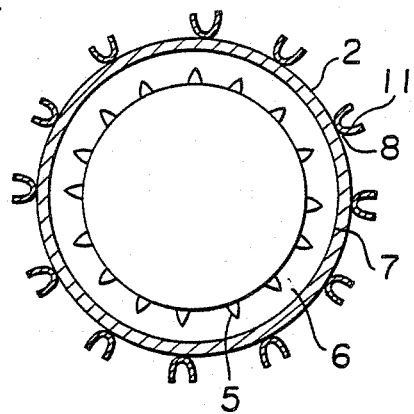
FIG. 6 is a cross-sectional view showing a typical motor frame.

Preferred embodiments of the present invention will be described with reference to the drawings wherein the same reference numerals designate the same or corresponding parts.

In FIGS. 1 to 3, a reference numeral 11 designates a heat radiation fin having a bent portion 11a to provide a projection to carry out projection welding. The heat radiation fin is formed by bending a rectangular metallic plate 12 into a U-shape in cross section. Numerals 13 and 14 respectively designate upper and lower electrodes of a resistance weldng machine. The upper electrode 13 is adapted to fit in the recess of the bent portion 11a of the heat radiation fin 11, and the lower electrode 14 is adapted to be in contact with the inner circumferential surface of the frame body 12 in the position opposing the upper electrode 13. The outer surface of the bent portion 11a is in contact with the outer circumferential surface of the frame body 2. Under the condition described above, a predetermined pressure is applied between the upper and lower electrodes while an electric current is supplied therebetween for the projectio welding. It is desirable that the radius of curvature of the outer surface of the bent portion 11a is about 5-10 mm when the heat radiation fin 11 having a thickness of about 2-4 mm is used. In this case, the width of weld is about 6-8 mm.

An embodiment of the method of producing the frame body according to the present invention will be described with reference to FIGS. 3a through 3g.

A metallic sheet material having a given thickness is cut or punched out to form a rectangular or square flat metallic plate 1 having a given size as shown in FIG. 3a. The flat plate 1 is subjected to rolling operations by a bending machine having two for three rollers (not shown) to be formed into a generally round body as shown in FIG. 3b. Then, the generally round body is put in a metal mold 23 consisting of upper and lower metal molds 21, 22, both cooperating to form an inner diameter which is suitable for forming the outer diameter of a frame body 2 to be produced, thereby compressing the generally round body in its radial direction. The step of compression of the generally round body by the upper and lower metal molds 21, 22 regulates the shape of the generally round body, especially of the opposing edges 15 of the generally round body (which are difficult to shape in a curved form), whereby the outer surface of the frame body 2 finally produced becomes a substantially true circle. The opposing edges 15 of the body are then bonded by welding in the longitudinal direction to form the cylindrical frame body 2 as shown in FIG. 3d. Then, a heat radiation fin 11 which has been previously formed into a U-shape in cross section by bending a rectangular metallic plate 12 is arranged on the outer circumferential surface of the frame body 2 so that the outer surface of the bent portion 11a is in contact with the outer circumferential surface of the frame body 2; thereafter, the heat radiation fin 11 is attached to the frame body 2 by projection welding. The projection welding is successively carried out for each heat radiation fin 11 (FIG. 3e shows that two heat radiation fins 11 are attached to the frame body 2). In the projection welding, since the outer circumferential surface of the frame body 2 is a substantially true circle, the heat radiation fins 11 are easily and preferably weld-bonded. However, in the projection welding to attach the heat radiation fins 11 on the outer circumferential surface of the frame body 2, thermal stress is produced in the frame body 2, whereby the inner diameter of the frame body 2 is deformed again in an oval form. To eliminate such deformation, a plurality of expansion pawl members 3 are inserted in the frame body 2 and the pawl members 3 are expanded outwardly in the radial direction to cause plastic deformation of the inner circumferential surface of the frame body 2 so that the inner diameter becomes a substantially true circle and suitable for insertion of a stator core 6. In this case, an elongation rate in the radial direction of the frame body 2 by the expansion step should be larger than an elongation rate of the frame body as determined by calculating the elongation in the circumferential direction of the frame body 2 caused by the projection welding, and so calculating the average elongation rate in the radial direction. By the expansion step, there is obtainable the frame body 2 having a nearly true circle and an inner surface area to which the outer circumferential surface of the stator core 6 is in close-contact with the inner circumferential surface of the frame body. Thus, the expansion step for the frame body 2 certainly regulates the thermal stress in the frame body 2 produced in the projection welding.

FIG. 3f shows a state where a plurality of the pawl members 3 are inserted into the frame body to press the inner circumferential surface in the radial direction to carry out the plastic deformation. Then, the stator core 6 with a plurality of slots 5 holding therein coils (not shown) is forcibly inserted in the frame body 2 thereby to form a stator (FIG. 3g).

In the motor frame manufactured as above-mentioned, the frame body 2 has a large inner surface area with which the outer circumferential surface of the stator core 6 is in contact and the surface area of the welded portion 8 for the heat radiation fins 11 is large. Accordingly, thermal resistance of contact between the frame body 2 and the stator core 6 and between the frame body 2 and the heat radiation fins 11 is made small, whereby temperature rise in the coils of the motor can be prevented.

In the embodiment described above, the projection welding of the heat radiation fins 11 to the frame body 2 is carried out after the welding step as shown in FIG. 3d. However, an expansion step which is separate from that as shown in FIG. 3f may be used between the steps as shown in FIGS. 3d and 3e in the case that the generrally round body 2 is not formed accurately in the steps as shown in FIGS. 3b and 3c and it is difficult to carried out the projection welding for the heat radiation fins 11. In this case, the width of the flat plate 1 in the direction of bending should be small in consideration of an elongation rate in the expansion step.

In the projection welding of the heat radiation fins 11 to the outer circumferential surface of the frame body 2, the following steps may be employed. Namely, a pair of heat radiation fins 11 are arranged to oppose each other, i.e. they are disposed on the outer circumferential surface of the frame body 2 spaced apart about 180° in the circumferential direction with respect to the axial line of the frame body 2 and the pair of heat radiation fins 11 are successively or simultaneously bonded to the frame body 2 by the welding. By using such step, the thermal stress resulted in the frame body 2 can be dispersed.

In addition to the heat radiation fins 11, the outer circumferential surface of the frame body 2 is provided with a fitting base portion for placing the motor at a position for in use, a hanging ear for hanging the motor or a terminal table formed around a hole which is formed in the flat plate 1 in the cutting or punching operation as shown in FIG. 3a, all being attached by welding. The welding operations for these members may be carried out in any step as shown in FIGS. 3d to 3g since effect of the thermal stress to the frame body 2 by the welding of these members is extremely smaller than that by welding the heat radiation fins.

In the above-mentioned embodiment, description has been made as to use of the projection welding to attach the heat radiation fins to the frame body 2. However, another method of welding may be utilized to provide an accurate surface area of weld for the heat radiation fins 11 on the frame body 2. For instance, a laser welding method in which severe accuracy for tracing a weld line is required, may be used.

FIG. 4 is a cross-sectional view in the case that the laser welding method is utilized. In this embodiment, the heat radiation fin 31 is formed from a piece of a rectangular plate and it is put on the outer circumferential surface of the frame body 2 which has been previously formed in a cylindrical form. The heat radiation fin 31 is clamped between a core metal 32 inserted inside the frame body 2 and a holding metal piece 33. A laser radiation gun 34 is moved along the contacting area 36 between the strip-like heat radiation fin 31 and the outer circumferential surface of the frame body 2 to apply a laser beam 35 to the contacting area 36, whereby the heat radiation fin 31 is bonded to the frame body 2 by the laser welding.

In accordance with the present invention, the inner circumferential surface of the frame body is pressed outwardly in the radial direction after the heat radiation fins are welded to the frame body formed previously in a cylindrical shape. Accordingly, the contacting surface area between the frame body and the stator core is sufficiently large while the bonding surface area of the heat radiation fins to the frame body is also made large, whereby the motor frame having excellent heat radiation properties can be obtained. Accordingly, burning of the coils resulted from temperature rise during operation of the motor and deterioration of the bearings for the rotating shaft of the motor can be certainly prevented.

Further, since the flat metal plate is bent into a generally round body and it is subjected to a compressing operation in the radial direction by a metal mold having a predetermined inner diameter, both edges and the contiguous portions of the generally round body can be preferably regulated (the regulation of these portions has been difficult in the conventional bending operations). In addition, insertion of the generally round body into the metal mold to compresses it in the radial direction forms the frame body in a substantially true circle, whereby the heat radiation fins can be easily welded with good contact to the outer circumferential surface of the frame body.

What is claimed is:

1. A method of producing a frame body for an electric motor which comprises in sequence:
    (1) a step of bending a flat plate having a given size into a generally round body,
    (2) a step of shaping said generally round body into a substantially true circle by pressing the generally round body in a radially inward direction by a metal mold having a given inner diameter,
    (3) a step of welding edge surface portions opposing each other of the body to form a cylindrical frame body,
    (4) a step of attaching heat radiation fins on the outer circumferential surface of the frame body by welding, whereby said frame body is deformed by thermal stresses, and
    (5) a step of plastically shaping said frame body having attached heat radiation fins into a substantially true circle by pressing the inner circumferential surface of the frame body in a radially outward direction until the frame body has a predetermined inner diameter.

2. The method of producing a frame body according to claim 1, wherein the metal mold has an inner diameter to give a predetermined outer diameter to the frame body and is diametrically separable as upper and lower metal molds.

3. The method of producing a frame body according to claim 1, wherein said fifth step is performed by a plurality of expansion pawl members positioned within said frame body.

4. The method of producing a frame body according to claim 1, wherein an elongation rate in the radial direction of the frame body in said fifth step is larger than an elongation rate of the frame body resulting from welding the heat radiation fins on the outer circumferential surface of the frame body, as determined by an elongation in the circumferential direction of the frame body during welding.

5. The method of producing a frame body according to claim 1, wherein said welding is projection welding.

* * * * *